United States Patent
Li et al.

(10) Patent No.: US 8,705,421 B2
(45) Date of Patent: Apr. 22, 2014

(54) METHODS AND APPARATUS FOR TIMING SYNCHRONIZATION FOR PEER TO PEER DEVICES OPERATING IN WWAN SPECTRUM

(75) Inventors: Junyi Li, Chester, NJ (US); Hua Wang, Bridgewater, NJ (US); Shailesh Patil, Bridgewater, NJ (US); Xinzhou Wu, Monmouth Junction, NJ (US); Thomas J. Richardson, South Orange, NJ (US); Anand Muralidhar, Champaign, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 13/092,835

(22) Filed: Apr. 22, 2011

(65) Prior Publication Data

US 2012/0269178 A1 Oct. 25, 2012

(51) Int. Cl.
*H04B 7/00* (2006.01)
*H04W 76/02* (2009.01)

(52) U.S. Cl.
CPC .................................... *H04W 76/02* (2013.01)
USPC ......................................................... 370/310

(58) Field of Classification Search
CPC .. H04W 76/025; H04W 76/026; H04W 76/04
USPC ................. 370/203–211, 310, 312, 328–330, 370/335–337; 455/422, 500, 522
See application file for complete search history.

(56) References Cited

U.S. PATENT DOCUMENTS

| | | | |
|---|---|---|---|
| 5,802,046 A | 9/1998 | Scott | |
| 7,023,835 B2* | 4/2006 | Terry | 370/350 |
| 7,286,841 B2 | 10/2007 | Sun et al. | |
| 7,286,842 B2* | 10/2007 | Li et al. | 455/502 |
| 7,336,638 B2* | 2/2008 | Cheng et al. | 370/338 |
| 7,548,758 B2* | 6/2009 | Periyalwar et al. | 455/517 |
| 7,760,694 B2* | 7/2010 | Cheung et al. | 370/338 |
| 8,060,105 B2* | 11/2011 | Jung et al. | 455/452.2 |
| 8,095,161 B2* | 1/2012 | Sandberg | 455/502 |
| 8,155,686 B2* | 4/2012 | Lee et al. | 455/522 |
| 2007/0010248 A1 | 1/2007 | Dravida et al. | |
| 2007/0133475 A1* | 6/2007 | Peisa et al. | 370/335 |
| 2007/0171910 A1 | 7/2007 | Kumar | |
| 2009/0010244 A1 | 1/2009 | Laroia et al. | |
| 2009/0318175 A1 | 12/2009 | Sandberg | |
| 2010/0067497 A1 | 3/2010 | Chmiel et al. | |
| 2010/0118841 A1* | 5/2010 | Kalhan | 370/338 |
| 2011/0007719 A1 | 1/2011 | Lee | |

OTHER PUBLICATIONS

International Search Report and Written Opinion—PCT/US2012/034592—ISA/EPO—Jul. 12, 2012.
3GPP: "3rd Generation Partnership Project;Technical Specification Group Radio Access Network; Evolved Universal Terrestrial Radio Access (E-UTRA) and Evolved Universal Terrestrial Radio Access Network (E-UTRAN); Overall description," (TS 36.300 V9.1.0, Stage 2, Release 9), Sep. 2009, pp. 3, Section 5.2.7.3.

* cited by examiner

*Primary Examiner* — Dmitry H Levitan
(74) *Attorney, Agent, or Firm* — James K. O'Hare (57) ABSTRACT

A method, an apparatus, and a computer program product are provided in which a clock timing is determined for utilizing resources including peer-to-peer resources based on a WWAN downlink receive timing and a WWAN uplink transmit timing. In addition, the clock timing is utilized for peer-to-peer communication with the peer-to-peer resources.

36 Claims, 8 Drawing Sheets

METHODS AND APPARATUS FOR TIMING SYNCHRONIZATION FOR PEER TO PEER DEVICES OPERATING IN WWAN SPECTRUM

BACKGROUND

1. Field

The present disclosure relates generally to communication systems, and more particularly, to timing synchronization for peer to peer devices operating in wireless wide area network (WWAN) spectrum.

2. Background

In a WWAN, all communication between wireless devices goes through the uplink and downlink channels between the wireless devices and the serving base station(s). When two communicating wireless devices are in the vicinity of each other, they can communicate directly without going through a base station. Such direct peer-to-peer communication can enable new types of services and/or reduce the traffic load on the base station.

To avoid interference between peer-to-peer communication and WWAN communication, peer-to-peer communication frames/resources and WWAN communication frames/resources are orthogonalized in time. As such, wireless devices participating in peer-to-peer communication need to be synchronized with each other in their peer-to-peer communication frames. As such, a need exists for synchronizing peer-to-peer communication in a synchronized Long Term Evolution (LTE) network in which evolved Node Bs (eNodeBs) are synchronized.

SUMMARY

In an aspect of the disclosure, a method, an apparatus, and a computer program product are provided in which a clock timing is determined for utilizing resources including peer-to-peer resources based on a WWAN downlink receive timing and a WWAN uplink transmit timing. In addition, the clock timing is utilized for peer-to-peer communication with the peer-to-peer resources.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Those skilled in the art will recognize how best to implement the described functionality presented throughout this disclosure depending on the particular application and the overall design constraints imposed on the overall system.

Figure 1:
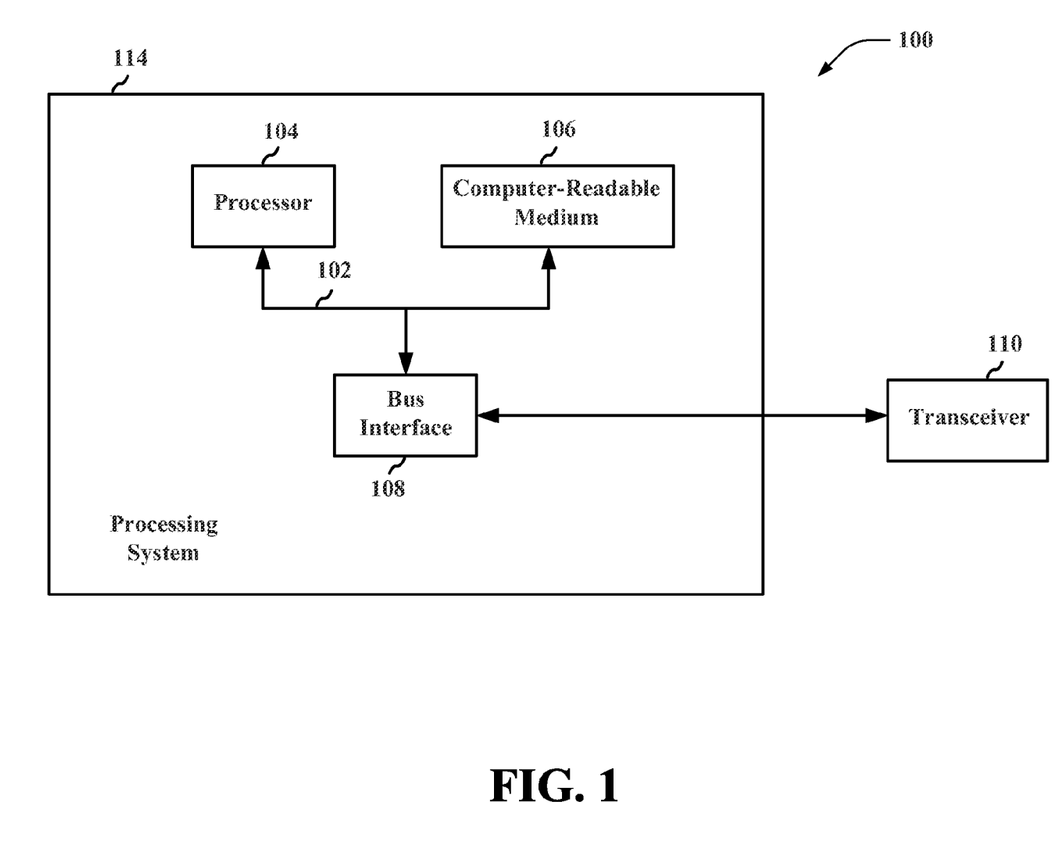
FIG. 1 is a diagram illustrating an example of a hardware implementation for an apparatus employing a processing system.

FIG. 1 is a conceptual diagram illustrating an example of a hardware implementation for an apparatus 100 employing a processing system 114. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors and/or hardware modules, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
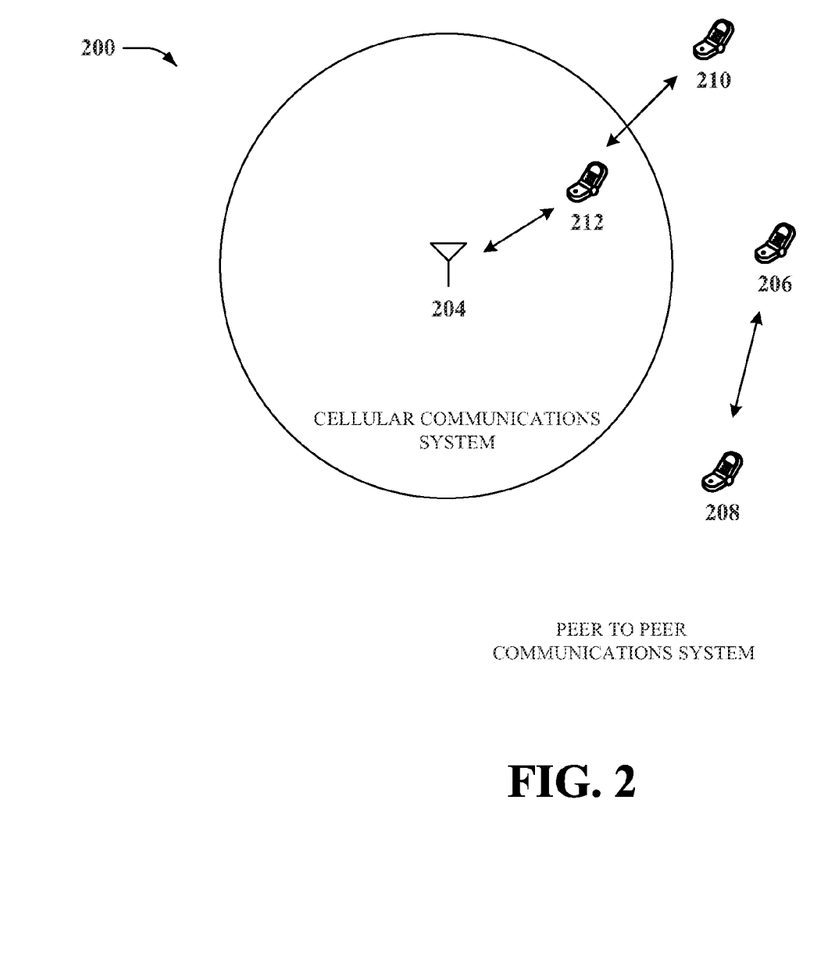
FIG. 2 is a diagram of a wireless peer-to-peer communications system.

FIG. 2 is a drawing of an exemplary peer-to-peer communications system 200. The peer-to-peer communications system 200 includes a plurality of wireless devices 206, 208, 210, 212. The peer-to-peer communications system 200 may overlap with a cellular communications system, such as for example, a WWAN. Some of the wireless devices 206, 208, 210, 212 may communicate together in peer-to-peer communication, some may communicate with the eNodeB 204, and some may do both. For example, as shown in FIG. 2, the wireless devices 206, 208 are in peer-to-peer communication and the wireless devices 210, 212 are in peer-to-peer communication. The wireless device 212 is also communicating with the eNodeB 204.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 3:
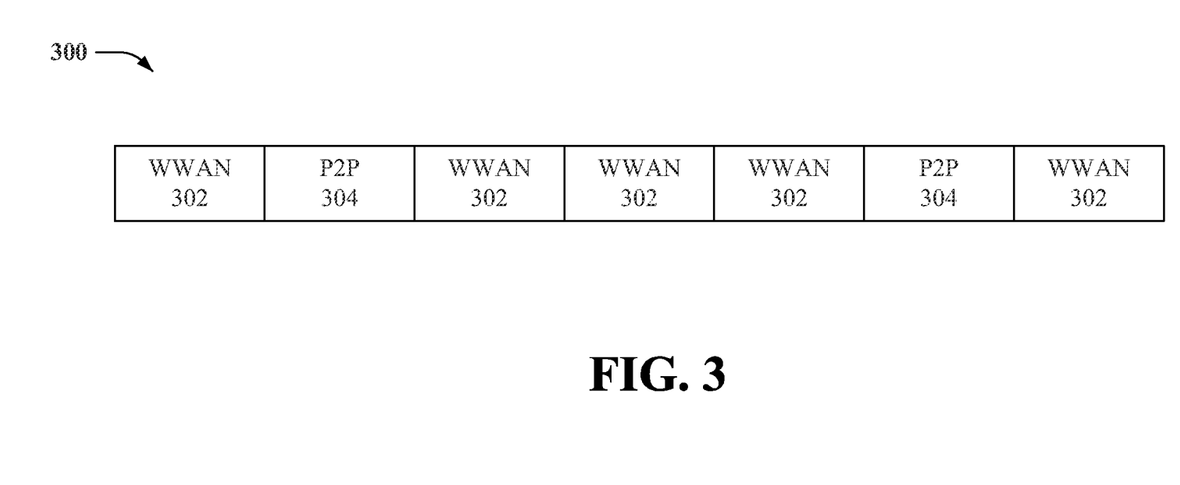
FIG. 3 is a diagram illustrating peer-to-peer communication resources and WWAN communication resources orthogonalized in time.

FIG. 3 is a diagram 300 illustrating peer-to-peer communication resources and WWAN communication resources orthogonalized in time. As shown in FIG. 3, the WWAN resources 302 and the peer-to-peer (P2P) resources 304 may be orthogonalized in time so that interference between WWAN communication and peer-to-peer communication can be avoided.

Figure 4:
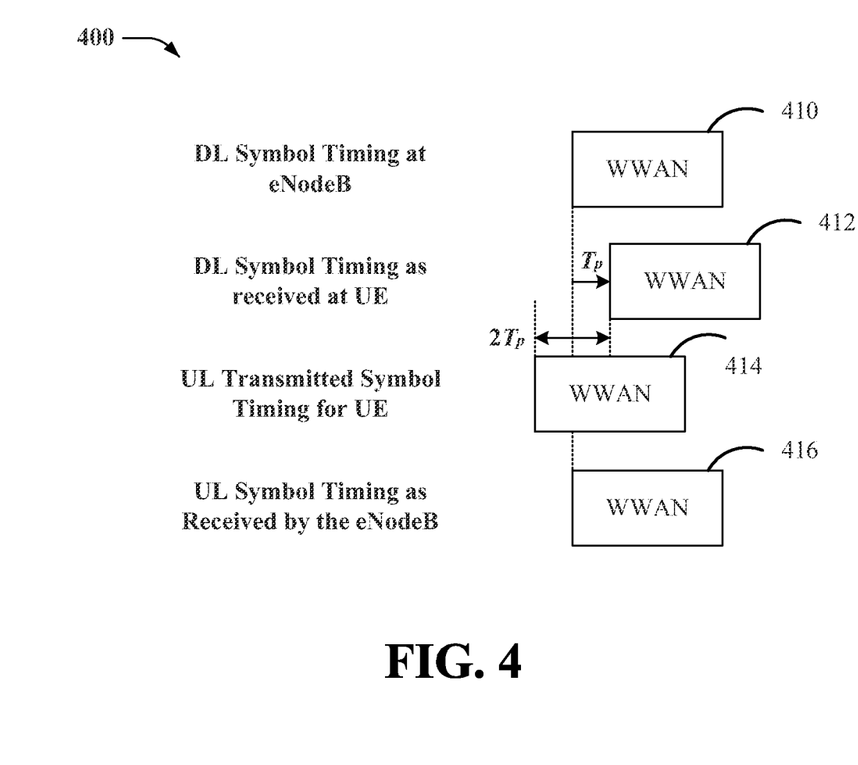
FIG. 4 is a diagram illustrating a downlink receive timing and a timing advance.

FIG. 4 is a diagram 400 illustrating a downlink receive timing and a timing advance. In a synchronized LTE network, a UE uses different timing for uplink and downlink communications with the associated eNodeB. The downlink symbol timing 412 as received by the UE is delayed by a propagation delay $T_p$ from the downlink symbol timing 410 at the eNodeB. Uplink orthogonality is maintained by ensuring that transmissions from UEs are time aligned at the receiver of the eNodeB. Uplink orthogonality avoids intra-cell interference occurring between UEs assigned to transmit in consecutive subframes and between UEs transmitting on adjacent subcarriers. Time alignment is achieved by the UE applying a timing advance of $2T_p$ with respect to the downlink symbol timing 412 as received at the UE such that the uplink transmitted symbol timing 414 for the UE is $T_p$ earlier than the uplink symbol timing 416 as received by the eNodeB.

Figure 5:
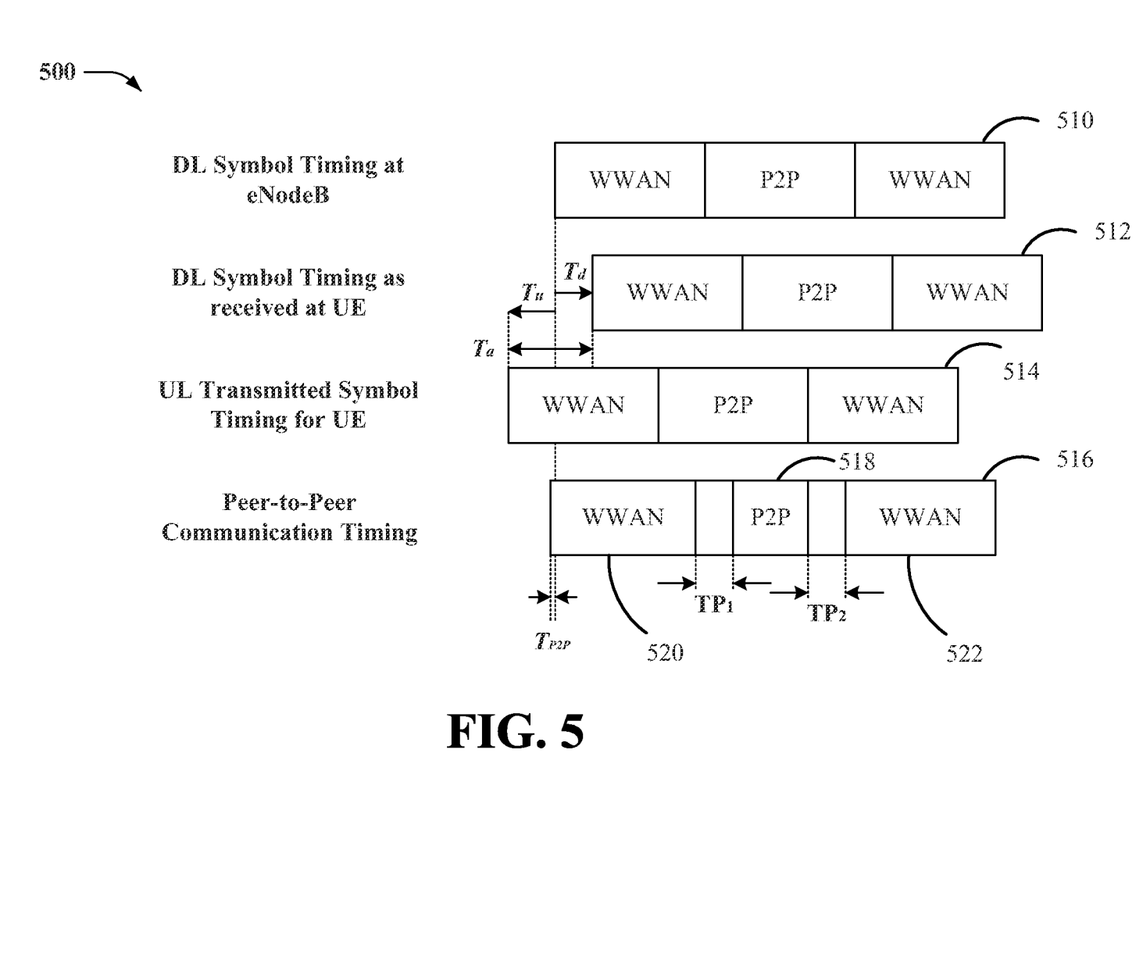
FIG. 5 is a diagram illustrating a peer-to-peer communication timing.

FIG. 5 is a diagram 500 for illustrating an exemplary method for determining a peer-to-peer communication timing. As shown in FIG. 5, the downlink symbol timing 512 as received by the UE is delayed by a propagation delay $T_d$ from the downlink symbol timing 510 at the eNodeB. Time alignment for maintaining uplink orthogonality is achieved by the UE applying a timing advance of $T_a$ with respect to the downlink symbol timing 512 as received at the UE such that the uplink transmitted symbol timing 514 for the UE is $T_u$ earlier than the downlink symbol timing 510 at the eNodeB. The uplink transmit timing $T_u$ is equal to the difference between the timing advance $T_a$ and the downlink receive timing $T_d$. The peer-to-peer communication timing 516 is determined by an offset $T_{P2P}$ with respect to the downlink symbol timing 510 at the eNodeB. The offset $T_{P2P}$ is an average of the uplink transmit timing $T_u$ and the downlink receive timing $T_d$. The relationship between the downlink receive timing $T_d$, the timing advance $T_a$, the uplink transmit timing $T_u$, and the offset $T_{P2P}$ are as follows:

$$|T_u| = |T_a| - |T_d| \quad \text{(Eq. 1)}$$

$$T_{P2P} = (T_u + T_d)/2 \quad \text{(Eq. 2)}$$

The peer-to-peer communication timing 516 with the offset $T_{P2P}$ with respect to the downlink symbol timing 510 at the eNodeB enables uniform peer-to-peer timing for peer UEs in a geographical neighborhood while minimizing adjustments with respect to the propagation delay from/to the eNodeB.

According to the exemplary method, a UE determines the peer-to-peer communication timing (i.e., clock timing) 516 for utilizing the peer-to-peer resources 518 based on a WWAN downlink receive timing $T_d$ and a WWAN uplink transmit timing $T_u$. The UE utilizes the clock timing 516 for peer-to-peer communication with the peer-to-peer resources 518. The UE determines the clock timing 516 by averaging the WWAN downlink receive timing $T_d$ and the WWAN uplink transmit timing $T_u$ (see Eq. 2). The UE determines the WWAN downlink receive timing $T_d$ based on a timing synchronization signal received from the eNodeB. The timing synchronization signal may be a primary synchronization signal (PSS) or a secondary synchronization signal (SSS). The UE receives the timing advance $T_a$ from the eNodeB and determines the WWAN uplink transmit timing $T_u$ based on the timing advance $T_a$ (see Eq. 1). Once the UE determines the peer-to-peer communication timing 516, the UE may broadcast the peer-to-peer communication timing 516 periodically in a secondary timing channel so that peer UEs that do not have an active uplink and downlink connection with the eNodeB can monitor the second timing channel and adopt the received timing information for peer-to-peer communication.

As shown in FIG. 5, the resources 516 may include the WWAN resources 520, 522 adjacent to the peer-to-peer resources 518. Based on the timing advance $T_a$, the UE may abstain or refrain from using portions of the peer-to-peer resources 518. That is, the UE may abstain from using a first time period $TP_1$ adjacent to the WWAN resources 520 and a second time period $TP_2$ adjacent to the WWAN resources 522. The first time period $TP_1$ is a time period during which other UEs receive signals from the eNodeB and the second time period $TP_2$ is a time period during which other UEs transmit signals to the eNodeB. In a first configuration, the first time period $TP_1$ and the second time period $TP_2$ are each equal to half of the timing advance $T_a$, such as when the timing advance $T_a$ is equal to twice the downlink receive timing $T_d$. In a second configuration, the first time period $TP_1$ is equal to the downlink receive timing $T_d$ and the second time period $TP_2$ is equal to the uplink transmit timing $T_u$, such as when the timing advance $T_a$ is not equal to twice the downlink receive timing $T_d$.

Figure 6:
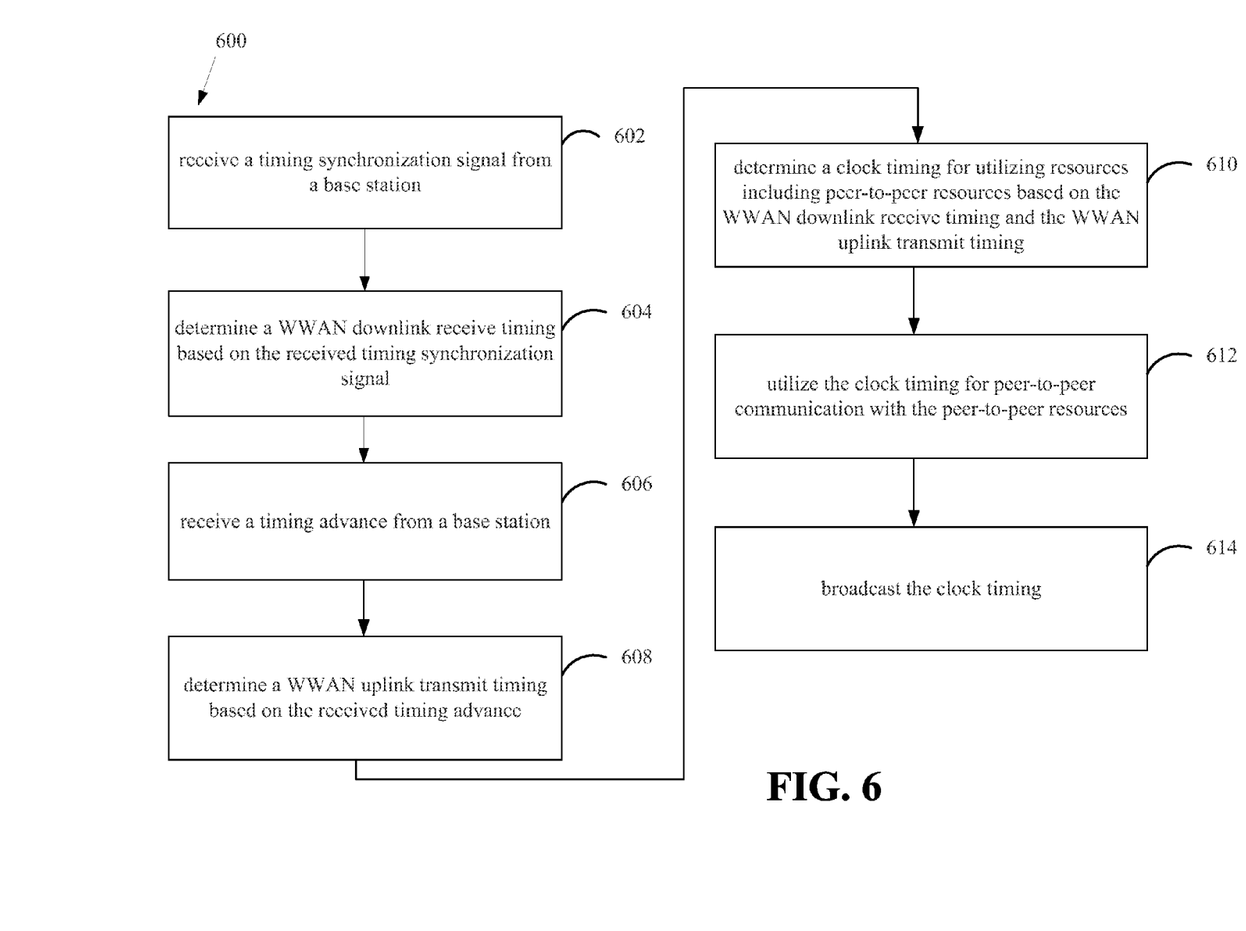
FIG. 6 is a flow chart of a method of wireless communication.

FIG. 6 is a flow chart 600 of an exemplary method. The method is performed by a UE. As shown in FIG. 6, a UE receives a timing synchronization signal from a base station (602). The UE determines a WWAN downlink receive timing based on the received timing synchronization signal (604). The UE receives a timing advance from a base station (606). The UE determines a WWAN uplink transmit timing based on the received timing advance (608). The UE then determines a clock timing for utilizing resources including peer-to-peer resources based on the WWAN downlink receive timing and the WWAN uplink transmit timing (610). The UE utilizes the clock timing for peer-to-peer communication with the peer-to-peer resources (612). The UE may broadcast the determined clock timing (614). The UE may determine the clock timing by averaging the WWAN downlink receive timing and the WWAN uplink transmit timing. The resources may further include WWAN resources frequency division multiplexed with the peer-to-peer resources.

Figure 7:
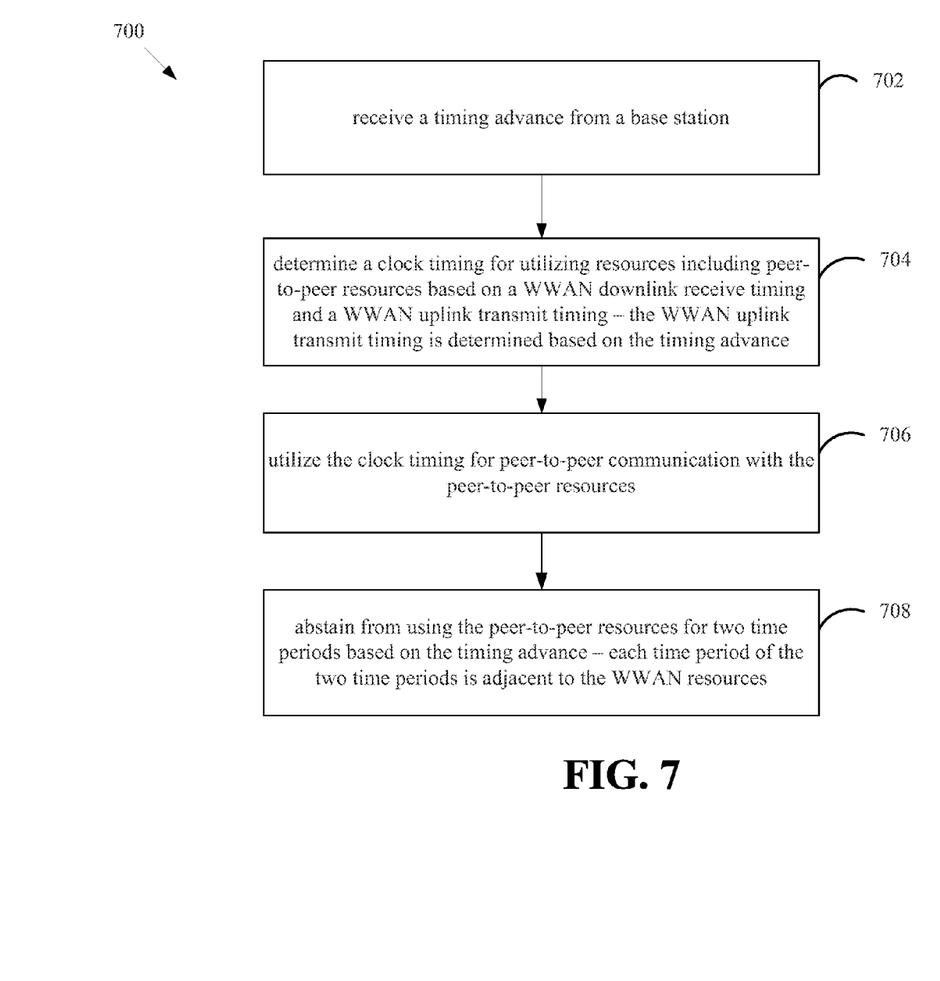
FIG. 7 is a flow chart of another method of wireless communication.

FIG. 7 is a flow chart 700 of another exemplary method. The method is performed by a UE. The resources may further include WWAN resources adjacent to the peer-to-peer resources. As shown in FIG. 7, the UE receives a timing advance from a base station (702). The UE determines a clock timing for utilizing resources including peer-to-peer resources based on a WWAN downlink receive timing and a WWAN uplink transmit timing (704). The WWAN uplink transmit timing is determined based on the timing advance (704). The UE utilizes the clock timing for peer-to-peer communication with the peer-to-peer resources (706). The UE abstains from using the peer-to-peer resources for two time periods based on the timing advance (708). Each time period of the two time periods is adjacent to the WWAN resources (708). Each time period may be half of the timing advance. The two time periods may include a first time period and a second time period. The first time period is a time period during which other wireless devices (i.e., UEs) receive signals from the base station and the second time period is a time period during which other wireless devices transmit signals to the base station. The first time period may be equal to the WWAN downlink receive timing and the second time period may be equal to the WWAN uplink transmit timing.

Figure 8:
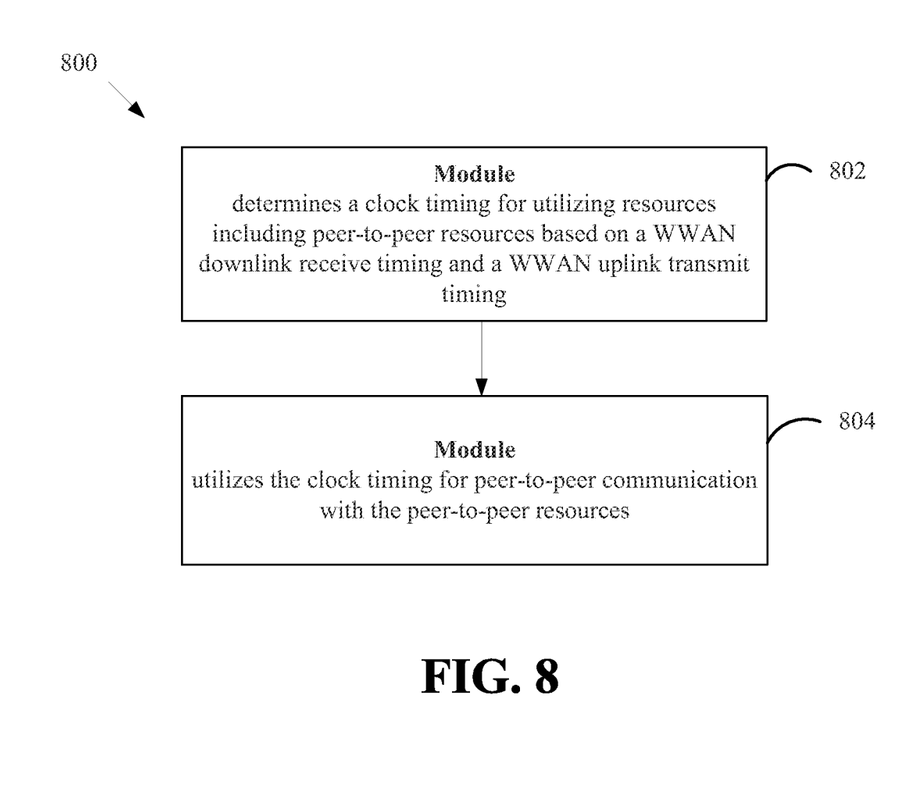
FIG. 8 is a conceptual block diagram illustrating the functionality of an exemplary apparatus.

FIG. 8 is a conceptual block diagram 800 illustrating the functionality of an exemplary apparatus 100. The exemplary apparatus 100 is a UE. The apparatus 100 includes a module 802 that determines a clock timing for utilizing resources including peer-to-peer resources based on a WWAN downlink receive timing and a WWAN uplink transmit timing. The apparatus 100 further includes a module 804 that utilizing the clock timing for peer-to-peer communication with the peer-to-peer resources. The apparatus 100 may include additional modules that perform each of the steps in the aforementioned flow charts. As such, each step in the aforementioned flow charts may be performed by a module and the apparatus 100 may include one or more of those modules.

Referring to FIG. 1, in one configuration, the apparatus 100 for wireless communication includes means for determining a clock timing for utilizing resources including peer-to-peer resources based on a WWAN downlink receive timing and a WWAN uplink transmit timing. The apparatus 100 further includes means for utilizing the clock timing for peer-to-peer communication with the peer-to-peer resources. The apparatus 100 may further include means for determining the clock timing averages the WWAN downlink receive timing and the WWAN uplink transmit timing. The apparatus 100 may further include means for receiving a timing synchronization signal from a base station, and means for determining the WWAN downlink receive timing based on the received timing synchronization signal. The apparatus 100 may further include means for receiving a timing advance from a base station, and means for determining the WWAN uplink transmit timing based on the received timing advance. In one configuration, the resources further include WWAN resources adjacent to the peer-to-peer resources. In such a configuration, the apparatus 100 may further include means for receiving a timing advance from a base station and means for abstaining from using the peer-to-peer resources for two time periods based on the timing advance. Each time period of the two time periods is adjacent to the WWAN resources. The apparatus 100 may further include means for broadcasting the clock timing. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication of a user equipment (UE), comprising:
   determining a clock timing for utilizing a set of resources comprising peer-to-peer resources based on a wireless wide area network (WWAN) downlink receive timing and a WWAN uplink transmit timing; and
   utilizing the clock timing for peer-to-peer communication with the peer-to-peer resources,
   wherein the determining the clock timing comprises averaging the WWAN downlink receive timing and the WWAN uplink transmit timing.

2. The method of claim 1, further comprising:
   receiving a timing synchronization signal from a base station; and
   determining the WWAN downlink receive timing based on the received timing synchronization signal.

3. The method of claim 1, further comprising:
   receiving a timing advance from a base station; and
   determining the WWAN uplink transmit timing based on the received timing advance.

4. The method of claim 1, wherein the set of resources further comprise WWAN resources frequency division multiplexed with the peer-to-peer resources.

5. The method of claim 1, wherein the set of resources further comprise WWAN resources adjacent to the peer-to-peer resources, and the method further comprises:
   receiving a timing advance from a base station; and
   abstaining from using the peer-to-peer resources for two time periods based on the timing advance, each time period of the two time periods being adjacent to the WWAN resources.

6. The method of claim 5, wherein said each time period is half of the timing advance.

7. The method of claim 5, wherein the two time periods comprise a first time period and a second time period, the first time period being a time period during which other UEs receive signals from the base station and the second time period being a time period during which other UEs transmit signals to the base station.

8. The method of claim 7, wherein the first time period is equal to the WWAN downlink receive timing and the second time period is equal to the WWAN uplink transmit timing.

9. The method of claim 1, further comprising broadcasting the clock timing.

10. An apparatus for wireless communication, the apparatus being a user equipment (UE), comprising:
    means for determining a clock timing for utilizing a set of resources comprising peer-to-peer resources based on a wireless wide area network (WWAN) downlink receive timing and a WWAN uplink transmit timing; and
    means for utilizing the clock timing for peer-to-peer communication with the peer-to-peer resources,
    wherein the means for determining the clock timing averages the WWAN downlink receive timing and the WWAN uplink transmit timing.

11. The apparatus of claim 10, further comprising:
    means for receiving a timing synchronization signal from a base station; and
    means for determining the WWAN downlink receive timing based on the received timing synchronization signal.

12. The apparatus of claim 10, further comprising:
    means for receiving a timing advance from a base station; and
    means for determining the WWAN uplink transmit timing based on the received timing advance.

13. The apparatus of claim 10, wherein the set of resources further comprise WWAN resources frequency division multiplexed with the peer-to-peer resources.

14. The apparatus of claim 10, wherein the set of resources further comprise WWAN resources adjacent to the peer-to-peer resources, and the apparatus further comprises:
    means for receiving a timing advance from a base station; and
    means for abstaining from using the peer-to-peer resources for two time periods based on the timing advance, each time period of the two time periods being adjacent to the WWAN resources.

15. The apparatus of claim 14, wherein said each time period is half of the timing advance.

16. The apparatus of claim 14, wherein the two time periods comprise a first time period and a second time period, the first time period being a time period during which other UEs receive signals from the base station and the second time period being a time period during which other UEs transmit signals to the base station.

17. The apparatus of claim 16, wherein the first time period is equal to the WWAN downlink receive timing and the second time period is equal to the WWAN uplink transmit timing.

18. The apparatus of claim 10, further comprising means for broadcasting the clock timing.

19. An apparatus for wireless communication, the apparatus being a user equipment (UE), comprising:
    a memory; and
    at least one processor coupled to the memory and configured to:
    determine a clock timing for utilizing a set of resources comprising peer-to-peer resources based on a wireless wide area network (WWAN) downlink receive timing and a WWAN uplink transmit timing; and
    utilize the clock timing for peer-to-peer communication with the peer-to-peer resources,
    wherein to determine the clock timing, the processing system is configured to average the WWAN downlink receive timing and the WWAN uplink transmit timing.

20. The apparatus of claim 19, wherein the processing system is further configured to:
    receive a timing synchronization signal from a base station; and
    determine the WWAN downlink receive timing based on the received timing synchronization signal.

21. The apparatus of claim 19, wherein the processing system is further configured to: receive a timing advance from a base station; and
    determine the WWAN uplink transmit timing based on the received timing advance.

22. The apparatus of claim 19, wherein the set of resources further comprise WWAN resources frequency division multiplexed with the peer-to-peer resources.

23. The apparatus of claim 19, wherein the set of resources further comprise WWAN resources adjacent to the peer-to-peer resources, and the processing system is further configured to:
   receive a timing advance from a base station; and
   abstain from using the peer-to-peer resources for two time periods based on the timing advance, each time period of the two time periods being adjacent to the WWAN resources.

24. The apparatus of claim 23, wherein said each time period is half of the timing advance.

25. The apparatus of claim 23, wherein the two time periods comprise a first time period and a second time period, the first time period being a time period during which other UEs receive signals from the base station and the second time period being a time period during which other UEs transmit signals to the base station.

26. The apparatus of claim 25, wherein the first time period is equal to the WWAN downlink receive timing and the second time period is equal to the WWAN uplink transmit timing.

27. The apparatus of claim 19, wherein the processing system is further configured to broadcast the clock timing.

28. A computer program product in a user equipment (UE), comprising:
   a non-transitory computer-readable medium comprising code for:
   determining a clock timing for utilizing a set of resources comprising peer-to-peer resources based on a wireless wide area network (WWAN) downlink receive timing and a WWAN uplink transmit timing; and
   utilizing the clock timing for peer-to-peer communication with the peer-to-peer resources,
   wherein the code for determining the clock timing averages the WWAN downlink receive timing and the WWAN uplink transmit timing.

29. The computer program product of claim 28, wherein the computer-readable medium further comprises code for:
   receiving a timing synchronization signal from a base station; and
   determining the WWAN downlink receive timing based on the received timing synchronization signal.

30. The computer program product of claim 28, wherein the computer-readable medium further comprises code for:
   receiving a timing advance from a base station; and
   determining the WWAN uplink transmit timing based on the received timing advance.

31. The computer program product of claim 28, wherein the set of resources further comprise WWAN resources frequency division multiplexed with the peer-to-peer resources.

32. The computer program product of claim 28, wherein the set of resources further comprise WWAN resources adjacent to the peer-to-peer resources, and the computer-readable medium further comprises code for:
   receiving a timing advance from a base station; and
   abstaining from using the peer-to-peer resources for two time periods based on the timing advance, each time period of the two time periods being adjacent to the WWAN resources.

33. The computer program product of claim 32, wherein said each time period is half of the timing advance.

34. The computer program product of claim 32, wherein the two time periods comprise a first time period and a second time period, the first time period being a time period during which other UEs receive signals from the base station and the second time period being a time period during which other UEs transmit signals to the base station.

35. The computer program product of claim 34, wherein the first time period is equal to the WWAN downlink receive timing and the second time period is equal to the WWAN uplink transmit timing.

36. The computer program product of claim 28, wherein the computer-readable medium further comprises code for broadcasting the clock timing.

\* \* \* \* \*